(12) United States Patent
Bergman

(10) Patent No.: US 9,970,308 B2
(45) Date of Patent: May 15, 2018

(54) FEATHER SEAL

(71) Applicant: United Technologies Corporation, Hartford, CT (US)

(72) Inventor: Russell J. Bergman, Windsor, CT (US)

(73) Assignee: UNITED TECHNOLOGIES CORPORATION, Farmington, CT (US)

(*) Notice: Subject to any disclaimer, the term of this patent is extended or adjusted under 35 U.S.C. 154(b) by 569 days.

(21) Appl. No.: 14/605,275

(22) Filed: Jan. 26, 2015

(65) Prior Publication Data

US 2016/0215640 A1 Jul. 28, 2016

(51) Int. Cl.
*F01D 11/00* (2006.01)
*F16J 15/08* (2006.01)

(52) U.S. Cl.
CPC ......... *F01D 11/005* (2013.01); *F16J 15/0887* (2013.01); *F05D 2220/32* (2013.01); *F05D 2240/11* (2013.01); *F05D 2240/55* (2013.01); *F05D 2240/57* (2013.01)

(58) Field of Classification Search
CPC ... F01D 11/005; F01D 11/006; F16J 15/0887; F05D 2240/57; F05D 2240/11; F05D 2240/55; F05D 2220/32
See application file for complete search history.

(56) References Cited

U.S. PATENT DOCUMENTS

| | | | | |
|---|---|---|---|---|
| 6,783,323 B2* | 8/2004 | Shiozaki | ............... | F01D 5/18 415/115 |
| 6,893,215 B2* | 5/2005 | Kuwabara | ............. | F01D 11/005 415/115 |
| 7,334,800 B2* | 2/2008 | Minnich | ............... | F01D 11/005 277/644 |
| 8,016,549 B2* | 9/2011 | Shah | ............... | F01D 5/16 277/650 |
| 9,416,675 B2* | 8/2016 | Lacy | ............... | F01D 11/005 |
| 2003/0039542 A1* | 2/2003 | Cromer | ............... | F01D 11/005 415/135 |
| 2009/0096174 A1* | 4/2009 | Spangler | ............... | F01D 11/005 277/345 |
| 2012/0292862 A1* | 11/2012 | Moehrle | ............... | F01D 11/003 277/654 |

* cited by examiner

*Primary Examiner* — Woody Lee, Jr.
*Assistant Examiner* — Adam W Brown
(74) *Attorney, Agent, or Firm* — Snell & Wilmer L.L.P.

(57) ABSTRACT

The present disclosure includes feather seals for use in gas turbine engines. The feather seals may be used in stationary components such as vanes or blade outer air seals. The feather seals may include stiffening elements, such as round or ovoid dimples, to improve the stiffness of the feather seals.

16 Claims, 4 Drawing Sheets

FEATHER SEAL

FIELD

The present disclosure relates generally to components of gas turbine engines and, more specifically, to feather seals used in components of gas turbine engines.

BACKGROUND

Gas turbine engines typically include a compressor section, a combustor section and a turbine section. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads.

One or more of the gas turbine engine sections may include, among other stationary components, a vane arrangement. Vane arrangements may be configured to guide and/or adjust flow of core gas between adjacent rotor stages within their respective engine section. Also, the vane arrangement may be configured to guide and/or adjust flow of core gas between their respective engine section and an adjacent (e.g., downstream) engine section.

A typical vane arrangement includes a plurality of stator vanes comprising an outer radial vane platform and an inner radial vane platform. Connections between adjacent stator vane platforms may be difficult and expensive to seal. Gas leakage through the connections may reduce engine efficiency as well as life span of various engine components. As such, improved feather seals which reduce gas leakage may be beneficial.

SUMMARY

A sealing assembly in accordance with various embodiments may comprise a feather seal positioned within a feather seal slot and comprising one or more stiffening elements, wherein the feather seal slot is defined by a first segment of a first component and a second segment of a second component. The stiffening element may comprise a dimple, including a round shaped dimple. The first and/or second segment may comprise a vane or a blade outer edge seal.

A section of a gas turbine engine in accordance with various embodiments may comprise a first segment and a second segment defining a feather seal slot, and a feather seal positioned within the feather seal slot and comprising one or more stiffening elements. The first and/or second segment may comprise a vane or a blade outer edge seal. The stiffening element may comprise a dimple, including a round shaped dimple.

A gas turbine engine in accordance with various embodiments may comprise an engine section comprising a first component comprising a first segment and a second component comprising a second segment, wherein the first segment and the second segment define a feather seal slot, and a feather seal comprising one or more stiffening elements and positioned within the feather seal slot. The engine section may comprise one of a compressor section and a turbine section. The first and/or second segment may comprise a vane or a blade outer edge seal. The stiffening element may comprise a dimple, including a round or ovoid shaped dimple.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of embodiments herein makes reference to the accompanying drawings, which show embodiments by way of illustration. While these embodiments are described in sufficient detail to enable those skilled in the art to practice the inventions, it should be understood that other embodiments may be realized and that logical and mechanical changes may be made without departing from the spirit and scope of the disclosure. Thus, the detailed description herein is presented for purposes of illustration only and not for limitation. For example, any reference to singular includes plural embodiments, and any reference to more than one component or step may include a singular embodiment or step. Also, any reference to attached, fixed, connected or the like may include permanent, removable, temporary, partial, full and/or any other possible attachment option.

Figure 1:
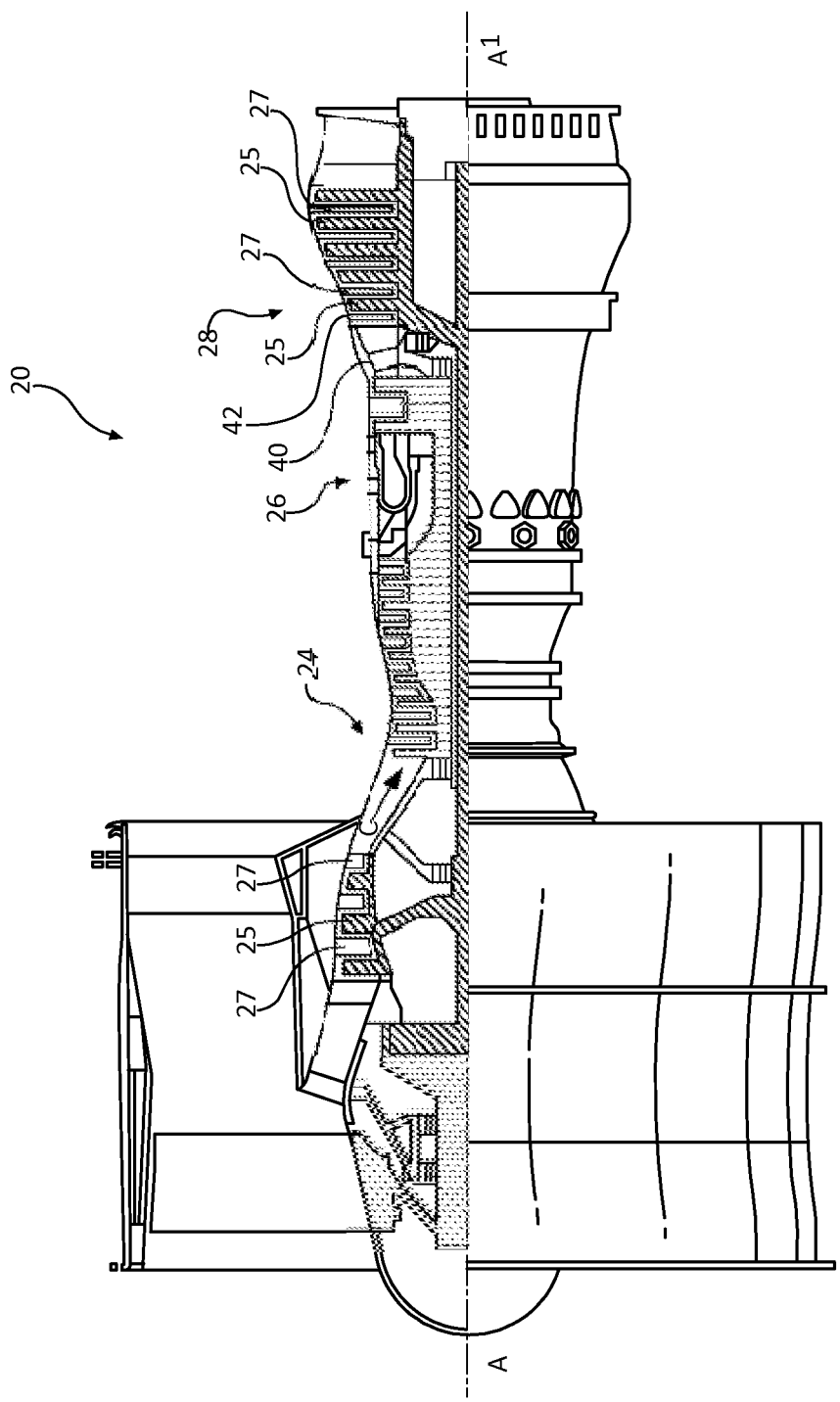
FIG. 1 illustrates, in accordance with various embodiments, a side view of a gas turbine engine.

Accordingly, with reference to FIG. 1, a gas turbine engine 20 is shown. In general terms, gas turbine engine 20 may comprise a compressor section 24. Air may flow through compressor section 24 and into a combustion section 26, where it is mixed with a fuel source and ignited to produce hot combustion gasses. These hot combustion gasses may drive a series of turbine blades within a turbine section 28, which in turn drive, for example, one or more compressor section blades mechanically coupled thereto.

Each of the compressor section 24 and the turbine section 28 may include alternating rows of rotor assemblies and vane assemblies (shown schematically) that carry airfoils that extend into the core flow path C. For example, the rotor assemblies may carry a plurality of rotating blades 25, while each vane assembly may carry a plurality of vanes 27 that extend into the core flow path C. Blades 25 create or extract energy (in the form of pressure) from the core airflow that is communicated through gas turbine engine 20 along the core flow path C. Vanes 27 direct the core airflow to blades 25 to either add or extract energy.

Figure 2:
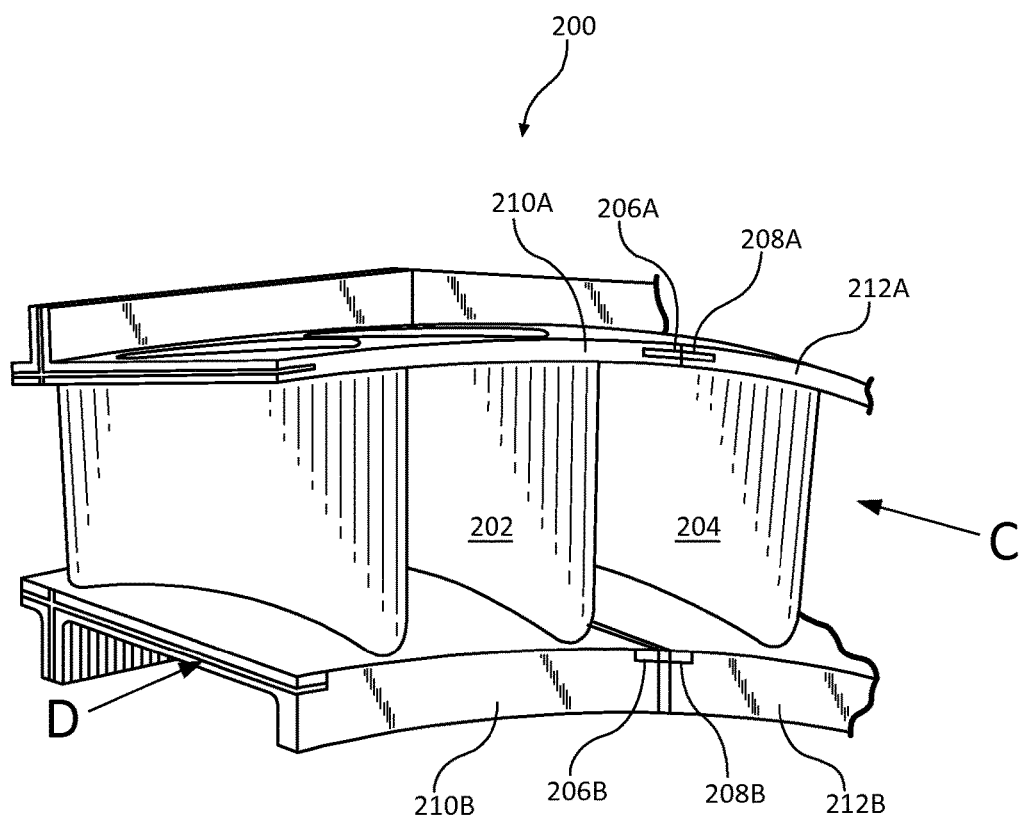
FIG. 2 illustrates, in accordance with various embodiments, a perspective view of an engine section having a plurality of stator vane segments.

With reference to FIG. 2, a segment of engine section 200 in accordance with various embodiments is illustrated. Engine section 200 may comprise, for example, compressor section 24 or turbine section 28. In various embodiments, engine section 200 may comprise a plurality of stationary components.

Engine section 200 may comprise, for example, a first component 202 and an adjacent second component 204. In various embodiments components 202 and 204 comprise stator vanes. Although specific embodiments are illustrated and described (e.g., components 202 and 204 are stator vanes), components 202 and 204 may comprise other stationary engine components, including but not limited to blade outer air seals.

The components of engine section 200 may comprise, for example, one or more segments. For example, first component 202 may comprise first segments 210a and 210b. In embodiments in which first component 202 is a vane, first segment 210a and 210b may comprise platforms. For example, first segment 210a may comprise a platform that is radially displaced from the platform of first segment 210b. Further, second component 204 may comprise second segments such as, for example, second segments 212a and 212b. Similar to first segments 210a and 210b, second segments 212a and 212b may comprise vane platforms.

In various embodiments, first segments 210a and 210b and/or second segments 212a and 212b may each comprise one or more circumferential gaps. For example, first segment 210a may comprise a first circumferential gap 206a, and first segment 210b may comprise a first circumferential gap 206b. Similarly, second segment 212a and/or 212b may comprise second circumferential gaps 208a and/or 208b. First segment 210a and second segment 212a may, for example, be positioned such that first circumferential gap 206a and/or 206b is facing and at least partially open to second circumferential gap 208a and/or 208b. With momentary reference to FIGS. 3A-3C, in various embodiments, first segment 210 and second segment 212 may be positioned apart from each other such that first circumferential gap 206 and second circumferential gap 208 define a feather seal slot 314.

With reference to FIG. 2, core flow path C may be located on one side of segments 210 and 212 and circumferential gaps 206 and 208. Generally, core path C is of a higher temperature and lower pressure than coolant flow D. However, there may be momentary instances during engine operation when core flow path C may temporarily have a higher pressure than coolant flow D.

Figure 3A:
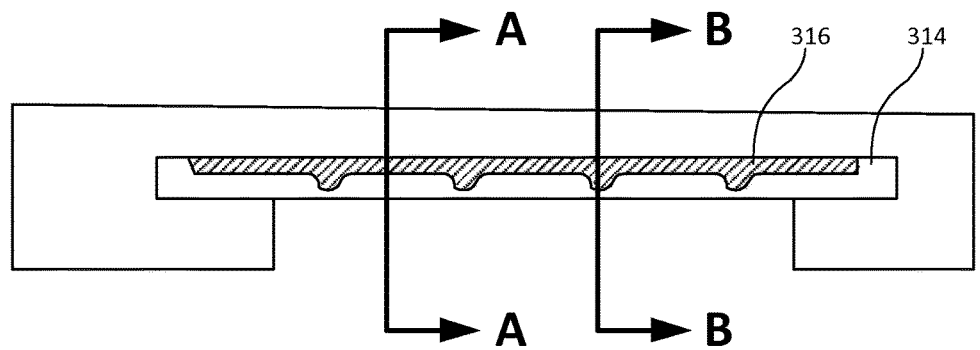
FIGS. 3A-3C illustrate, in accordance with various embodiments, cross sectional views of a gas turbine engine component having a feather seal.
Figure 3B:
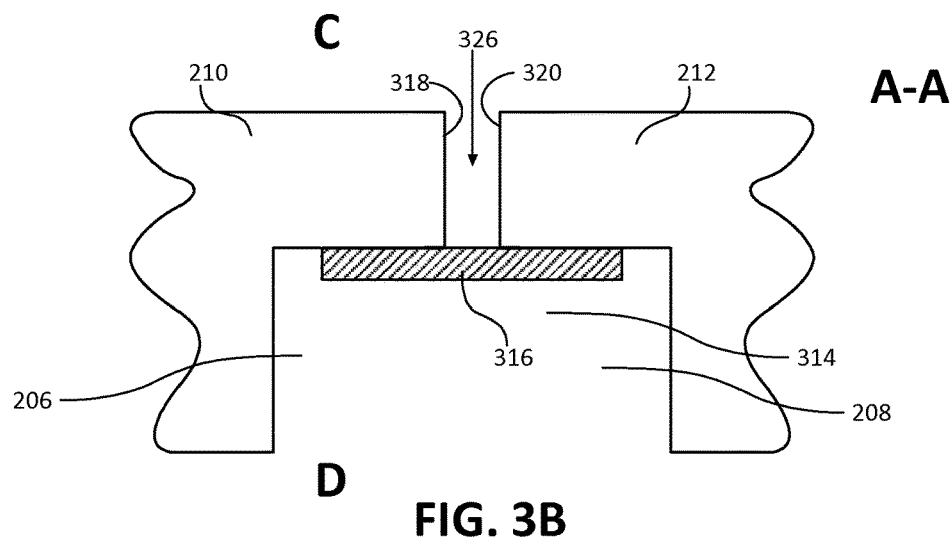
Figure 3C:
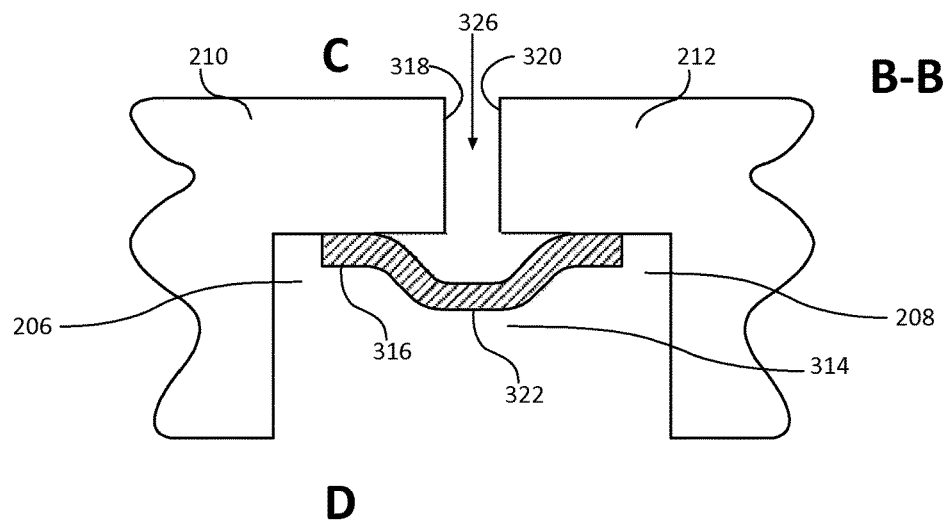

With reference to FIGS. 3A-3C, first segment 210 may comprise, for example, a first mate face 318. Similarly, second segment 212 may comprise, for example, a second mate face 320. In various embodiments, first mate face 318 and second mate face 320 are positioned apart from each other and define a radial gap 326 (in the radial direction) and feather seal slot 314 (formed by first circumferential gap 206 and second circumferential gap 208). In the absence of a seal, air from coolant flow path D could pass through radial gap 326 and mix with gas flow path C. Such leakage of cooling flow path D into gas path flow C is undesirable as it reduces the aerodynamic efficiency of gas path flow C. Further, it is desired to utilize a minimal amount of cooling flow path air D because the compressor blades use energy to compress the air and the turbine blades may not extract energy. The combination of these losses may result in a less efficient turbine engine.

Such leakage of gas path air through radial gap 326 may be undesirable as it may reduce the total flow of pressurized air within engine section 200. Further, hot and pressurized gas path air leaking through radial gap 326 and mixing with cooling air outside of engine section 200, may reduce the cooling potential of the cooling air. Prolonged leakage from core flow path C to coolant flow path D may also result in oxidation of the engine section segment, leading to deterioration of the engine section segment performance and integrity.

In various embodiments, engine section 200 comprises a feather seal 316 positioned within feather seal slot 314 and configured to reduce leakage of air between gas path C and cooling flow path D. Feather seal 316 may, for example, act to reduce gas path air leakage through radial gap 326. In such embodiments, gas path air provides radial force to feather seal 316, causing it to contact first segment 210 and 212 within feather seal slot 314 and seal radial gap 326.

Feather seal 316 may comprise, for example, a metallic material, such as steel, aluminum, nickel, alloys thereof, and/or any other suitable metallic material. In various embodiments, the pressure of coolant path D may decrease or reverse which may distort or deform feather seal 316. In such instances, feather seal 316 may be permanently deformed, and its ability to form a seal may be reduced.

Figure 4A:
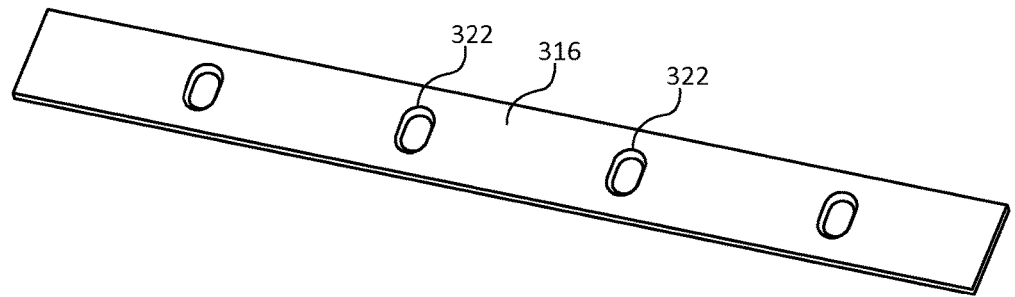
FIGS. 4A and 4B illustrate, in accordance with various embodiments, perspective views of various feather seals.
Figure 4B:
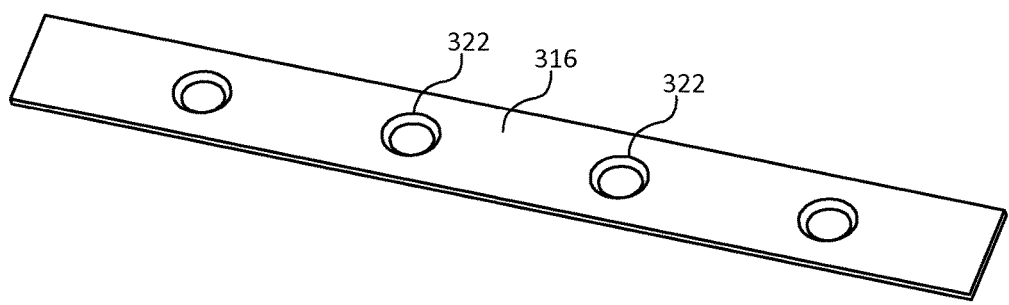

With reference to FIGS. 4A and 4B, in various embodiments, feather seal 316 may comprise one or more stiffening elements 322. One or more stiffening elements 322 may be incorporated, added to, or coupled to feather seal 316. In such embodiments, stiffening elements 332 may provide increased structural strength to feather seal 316, potentially reducing distortion or deformation of feather seal 316 during use of gas turbine engine 20.

Stiffening elements 322 may comprise, for example, an impression or a dimple. In such embodiments, stiffening elements 322 may be pressed into feather seal 316. For example, stiffening elements 322 may comprise a round or ovoid dimple pressed into feather seal 316. In further embodiments, stiffening elements 322 may comprise material added to feather seal 316 by, for example, electromachining, welding, electrodeposition, or any other additive process. Although described with reference to specific embodiments, any stiffening element capable of resisting distortion or deformation of feather seal 316 is within the scope of the present disclosure.

In various embodiments, feather seal 316 and stiffening elements 332 may be formed through an additive manufacturing process. For example, feather seal 316 and stiffening elements 322 can be formed using, for example, fused deposition modeling, polyjet 3D printing, electron beam freeform fabrication, direct metal laser sintering, electron-beam melting, selective laser melting, selective heat sintering, selective laser sintering, stereolithography, multiphoton photopolymerization, and/or digital light processing. Feather seal 316 may also be manufactured using "conventional" techniques such as, for example, casting, machining, welding, or bonding. Any material and configuration of feather seal 316 and/or stiffening elements 322 capable of withstanding air pressure associated with inflated aircraft tires is within the scope of the present disclosure The connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A feather seal comprising:
an axial seal configured for positioning within a feather seal slot and comprising a stiffening element,
wherein the axial seal comprises a first surface and a second surface spaced from the first surface, the first surface defining a first plane and the second surface defining a second plane, and wherein the stiffening element comprises an impression extending inward from the second plane toward the first plane,
wherein the feather seal slot is defined by a first component comprising a first segment having a first circumferential gap and a second component comprising a second segment having a second circumferential gap,
wherein the first segment and the second segment are circumferentially spaced apart to form a radial gap, and wherein the feather seal is configured to seal the gap.

2. The feather seal of claim 1, further comprising a plurality of stiffening elements.

3. The feather seal of claim 1, wherein the first segment comprises a vane.

4. The feather seal of claim 3, wherein the second segment comprises a vane.

5. The feather seal of claim 1, wherein the first segment comprises a blade outer edge seal.

6. A gas turbine engine section comprising:
a first component having a first segment and a first circumferential gap;
a second component having a second segment and a second circumferential gap, wherein the first circumferential gap and the second circumferential gap define a feather seal slot; and a feather seal positioned within the feather seal slot and comprising a stiffening element,
wherein the feather seal comprises a first surface and a second surface spaced from the first surface, the first surface defining a first plane and the second surface defining a second plane, and wherein the stiffening element comprises an impression extending inward from the second plane toward the first plane.

7. The gas turbine engine section of claim 6, wherein the first segment comprises a vane.

8. The gas turbine engine section of claim 6, wherein the first segment comprises a blade outer edge seal.

9. The gas turbine engine section of claim 6, further comprising a plurality of stiffening elements.

10. A gas turbine engine comprising:
an engine section comprising a first component comprising a first segment having a first circumferential gap and a second component comprising a second segment having a second circumferential gap, wherein the first circumferential gap and the second circumferential gap define a feather seal slot; and
a feather seal comprising a stiffening element and positioned within the feather seal slot, wherein the first segment and the second segment are circumferentially spaced apart to form a radial gap, wherein the feather seal comprises a first surface and a second surface spaced from the first surface, the first surface defining a first plane and the second surface defining a second plane, wherein the stiffening element comprises an impression extending inward from the second plane toward the first plane, and wherein the feather seal is configured to seal the gap.

11. The gas turbine engine of claim 10, wherein the engine section comprises one of a compressor section and a turbine section.

12. The gas turbine engine of claim 10, wherein the first component comprises a vane.

13. The gas turbine engine of claim 10, wherein the first component comprises a blade outer edge seal.

14. The gas turbine engine of claim 10, further comprising a plurality of stiffening elements.

15. The gas turbine engine of claim 10, wherein the stiffening element comprises a round shape.

16. The gas turbine engine of claim 10, wherein the stiffening element comprises an ovoid shape.

* * * * *